United States Patent [19]

Tompkins et al.

[11] 3,922,043
[45] Nov. 25, 1975

[54] VIBRATOR

[76] Inventors: Lawrence K. Tompkins, Pecos Lane, Little Rock, Ark. 72207; John Fallows, 1215 Old Charter Court, Little Rock, Ark. 72205

[22] Filed: June 18, 1974

[21] Appl. No.: 480,497

[52] U.S. Cl. .................................. 308/187; 74/87
[51] Int. Cl.² ............................................. F16C 1/24
[58] Field of Search ............... 308/177, 187, 187.1; 74/61, 87

[56] References Cited
UNITED STATES PATENTS

| | | | |
|---|---|---|---|
| 2,884,790 | 5/1959 | Lehman | 74/87 X |
| 2,930,244 | 3/1960 | Hutchinson et al. | 74/87 X |
| 3,177,731 | 4/1965 | Peterson | 74/87 |
| 3,238,799 | 3/1966 | Parks | 74/87 |

*Primary Examiner*—M. Henson Wood, Jr.
*Assistant Examiner*—Michael Mar
*Attorney, Agent, or Firm*—Brumbaugh, Graves, Donohue & Raymond

[57] ABSTRACT

A vibrating machine having a housing assembly in which a shaft is rotatably mounted by a sealed bearing assembly. The latter advantageously includes a pair of roller bearings fitted in an opening provided in a web defining portion of the housing assembly. The outer race of each bearing is provided with one or more holes permitting oil, or a similar lubricant, to be circulated through the race and into an associated recess provided in the web. Cover plates sealingly enclose the bearings within the opening provided in the web so as to confine the lubricant in a predetermined space. Air coming from the exhaust of a motor arranged for turning the shaft, on which one or more eccentrics are mounted, or from a similar source, is passed over the cover plates to absorb heat therefrom and remove the heat from the housing assembly.

4 Claims, 3 Drawing Figures

U.S. Patent  Nov. 25, 1975  3,922,043
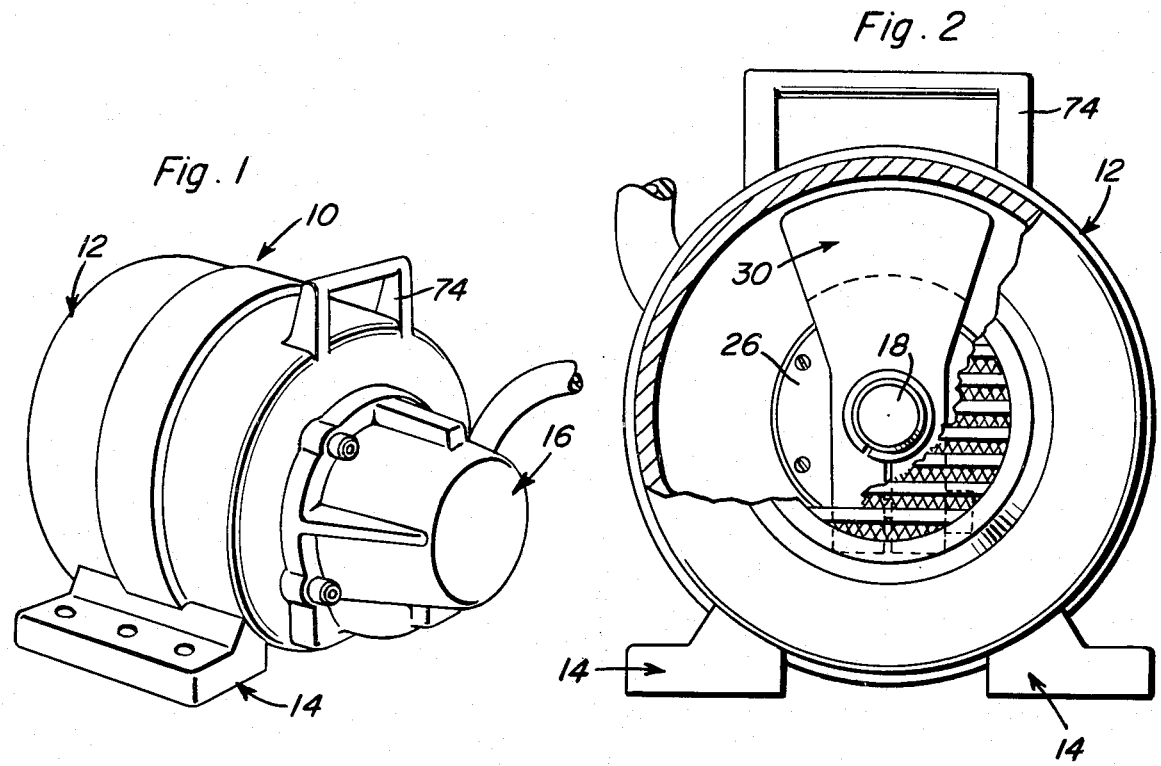
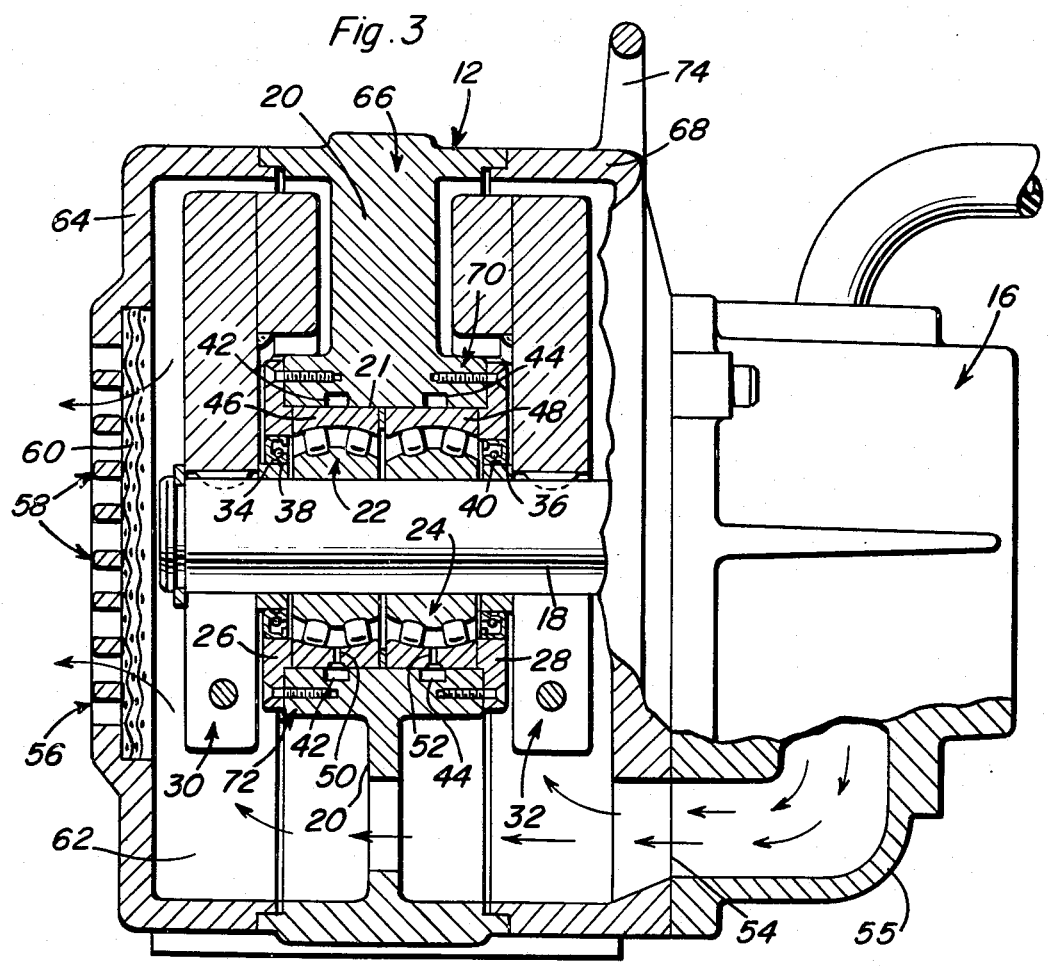

VIBRATOR

BACKGROUND OF THE INVENTION

1. Field of the Invention

This invention relates generally to an improved vibrating machine, and particularly to a vibrating machine having an improved permanent lubrication system.

2. Description of the Prior Art

Conventional vibrators of the kind that employ rotating eccentrics use part of the exhaust air from the pneumatic or similar motor associated with the vibrator to lubricate the main bearings which support the eccentric weights. In practice, however, this arrangement has proven to be one of the main reasons for bearing failure, because in most industrial compressed air systems a great deal of contamination is present which enters the bearings with the exhaust air.

Sealed, grease lubricated bearings have also been used in vibrators. While slightly longer life has been experienced with these sealed bearings, poor heat transfer in these bearings has tended to cause overheating which destroys the lubricating properties of the grease with resulting premature failure of the bearing.

Prior patents believed pertinent to this invention are as follows:

| | | |
|---|---|---|
| 3,386,296 | C. G. Matson | June 4, 1968 |
| 3,036,658 | E. F. Peterson | May 29, 1962 |
| 2,930,244 | D. Hutchinson et al | Mar. 29, 1960 |
| 3,792,617 | H. Strasser et al | Aug. 3, 1972 |
| 2,972,688 | W. Mahlfeldt | Feb. 21, 1961 |
| 3,446,084 | A. G. Bodine, Jr. | May 27, 1969 |

SUMMARY OF THE INVENTION

It is an object of the present invention to provide a vibrating machine wherein the bearing members thereof are isolated from the outside atmosphere.

It is another object of the present invention to provide a sealed-bearing vibrating machine having improved heat transfer from the sealed bearing.

It is still another object of the present invention to provide a vibrating machine affording reduced operating noise levels.

It is yet another object of the present invention to provide a vibrating machine having a mount which allows a permanent installation giving greater rigidity to the machine.

These and other objects are achieved according to the present invention by providing a vibrating machine having: a housing assembly including a portion provided with a web; a shaft connectible to a motor associated with the housing assembly and passing through an opening provided in the web; a bearing mounted within the opening of the web and arranged for rotatably mounting the shaft within the housing assembly; and a sealing arrangement mounted on the web for confining a lubricant associated with the bearing.

A recess is advantageously provided in the web and arranged communicating with the opening of the web, while the bearing includes an outer race fitted in the web opening and has one or more holes provided in the outer race thereof for permitting the lubricant to flow through the outer race by passing through the hole or holes and into the recess. This flow will take place under the action of the, for example, rollers when a roller bearing is employed as the shaft mounting bearing.

According to a preferred embodiment of the present invention, a pair of spherical roller bearings are arranged in the opening provided in the web. The outer race of each of these roller bearings is provided with the aforementioned hole or holes, while each outer race has a matching recess provided in the wall of the web opening. Cover plates, and the like, are mounted on the web for enclosing the sides of the bearings and forming an enclosure which confines the lubricant associated with the bearings.

The housing assembly advantageously has an inlet port arranged for receiving, for example, exhaust air from a motor associated with the vibrating machine, and with an outlet port including an arrangement which diffuses the air received from a case formed by the housing assembly. This case acts as an expansion chamber for the air for permitting same to absorb heat from the bearing assembly by passing over, for example, the cover plates, and to remove the heat from the housing assembly while maintaining the operating noise of the machine at acceptable levels well within the limits of present-day noise regulations.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view showing a vibrating machine according to the present invention.

FIG. 2 is an end elevational view, partly cut away and in section, showing the vibrating machine of FIG. 1.

FIG. 3 is a vertical, longitudinal sectional view showing the vibrating machine of FIGS. 1 and 2.

DESCRIPTION OF THE PREFERRED EMBODIMENT

Referring now more particularly to the drawings, a vibrating machine 10 according to the present invention has a housing assembly 12 provided with a mount in the form of a, for example, six bolt, bolt on base 14 which allows a permanent installation of machine 10 giving greater rigidity to the machine. A conventional motor 16, and the like, is mounted on assembly 12 for actuating machine 10 in a manner to be described below. A shaft 18 extends from the shaft (not shown) of motor 16 and into housing assembly 12. This shaft 18 is rotatably mounted in housing assembly 12 in a manner to be described below for a purpose to be set out also below.

Assembly 12 includes a web 20 provided with an opening 21 in which are arranged a pair of, for example, spherical roller bearings 22 and 24. As can be readily seen from FIG. 3 of the drawings, these bearings 22 and 24 are arranged for rotatably mounting shaft 18 within housing assembly 12. Bearings 22 and 24 are sealed within opening 21 as by a pair of cover plates 26 and 28 arranged blocking opening 21 and bracketing the bearings. In this manner, a suitable lubricant, such as an oil, is confined within the space defined by opening 21 and plates 26. A pair of eccentrically mounted weights, or eccentrics 30 and 32, are mounted on shaft 18 for rotation therewith and advantageously arranged bracketing web 20 and bearings 22 and 24 as is shown in FIG. 3 of the drawings. Rotation of shaft 18 with the eccentrics 30, 32 thereon will result in vibrations in a conventional manner.

Each cover plate 26, 28 is provided with an annular opening 34 and 36, respectively. A suitable double-lip seal ring 38 and 40 is fitted in the annular opening 34, 36, respectively, for protecting the lubricant from contamination from foreign material while retaining the lubricant in the confined space associated with bearings 22 and 24. Thus, seal rings 38 and 40 act as further seals for bearings 22 and 24.

Recesses 42 and 44 are provided in web 20 and are arranged communicating with opening 21. Each bearing 22 and 24 includes an outer race 46 and 48, respectively, fitted into opening 21 so that each race 46, 48 is matched with a recess 42, 44. At least one, and advantageously a plurality of holes 50 and 52, only one of which are shown in FIG. 3 of the drawings, are provided in races 46 and 48 and are arranged for permitting the lubricant to flow through the outer race and into the recesses 42 and 44. The latter can be seen to form reservoirs for the lubricating oil, and the like. The oil is forced through holes 50, 52 and into recesses 42 and 44 as by the action of the rollers of bearings 22 and 24.

Housing assembly 12 advantageously has an inlet port 54 arranged for receiving, for example, exhaust air, and the like, as from the exhaust portion 55 of motor 16. Housing assembly 12 is also provided with an outlet port 56 across which extends a plurality of longitudinal members forming a grill 58 which partially retains a filter 60 constructed from expanded aluminum, and the like. Housing assembly 12 forms a case which acts as an expansion chamber 62 for expanding the air received from inlet port 54 and permitting the air to absorb heat from the bearing sealing arrangement, and especially from the cover plates 26, 28, and remove the heat from the housing assembly 12 as the air passes out of outlet port 56. By using the vibrator case as an expansion chamber for the exhaust air from motor 16, and diffusing this exhaust air to the atmosphere through the, for example, expanded aluminum at outlet port 56, with the outlet port 56 being advantageously arranged opposite inlet port 54, a substantial reduction in the operating noise of the vibrating machine is achieved which brings the machine well within the limits of present day noise requirements.

As can be readily appreciated from FIG. 3 of the drawings, housing assembly 12 is formed by three parts designated 64, 66, and 68. Part 66 includes web 20, while parts 64 and 68 bracket portion 66 to form a substantially enclosed housing. Web 20 is provided with cooperating flanges 70 and 72 defining opening 21 and providing structure in the form of an annular boss to which cover plates 26 and 28 may be fastened as by the illustrated machine screws. A handle 74 may be provided on housing part 68 to facilitate handling of machine 10.

As will be readily appreciated from the above description and from the drawings, bearings 22 and 24 are lubricated with a suitable lubricating oil (not shown) and the like by circulation of the oil through the oil holes 50 and 52 in outer rings or races 46 and 48 into the reservoirs formed by recesses 42 and 44 by the action of the rollers of the roller bearings 22 and 24. In this manner, heat is transferred by the oil to the bearing housing. Since all of the exhaust air from motor 16 is expelled through the case past the bearing housing, the bearings 22 and 24 are maintained at a safe operating temperature and a good working life of the bearings is achieved.

An additional advantageous feature of the present invention is the provision of milled vents in the eccentrics 30 and 32 for causing same to draw air in the manner of an exhaust fan through the case of the vibrating machine 10 and facilitate the flow of the exhaust air from motor 16. Alternatively, these vents could draw air through the casing from the atmosphere.

As mentioned above, the mounting arrangement of bearings 22 and 24 improves the life thereof and allows longer operating periods of machine 10. The bearings 22 and 24 are lubricated for life upon assembly of vibrating machine 10. The double-lip oil seals further seal bearings 22 and 24 for added protection from foreign material and to retain the lubricant.

In closing, it is noted that the improved vibrating machine 10 according to the present invention eliminates the hazard of earlier vibrating machines wherein the exhaust air has been used for lubricating the bearings. Such exhaust air will necessarily contain contaminants of foreign matter from time to time which cause early failure of the bearings. In machine 10, however, the exhaust air is employed without risk of contamination to the bearings. Further, the vibrating machine according to the present invention is adaptable in that air, electric, or hydraulic motors may be employed to power the machine without a single design modification. Machine 10 may also be furnished as a portable unit with clamping screws (not shown) for a quick change mounting, such as to a railroad car (not shown), and the like.

Housing assembly 12 may be constructed of a cast steel or malleable iron center part 66, with sufficient distance provided in web 20 for assuring adequate lubrication capacity and suitable bearing seats. Sag cover parts 64 and 68 may be constructed from, for example, cast aluminum, and the like, to form the expansion chamber 62 for quieting the noise level of machine 10. The illustrated round, or cylindrical, configuration of machine 10 is a benefit in that it prevents a buildup of foreign material which would cause overheating or early failure of the bearing assembly.

A yellow paint, and the like, is easily applied to machine 10 for positive identification thereof and easy detection of the vibrator when same is operating on a particular piece of equipment.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:
1. A vibrator, the improvement comprising:
   a. a housing assembly including a web provided with an opening and provided with a lubricant containing recess communicating with the opening;
   b. a rotatable shaft extending into the housing and through the opening provided in the web;
   c. a bearing including an outer race arranged within the web opening for rotatably mounting the shaft within the housing assembly, the outer race having a hole formed therein and arranged to permit lubricant to flow through the outer race and into the lu- bricant containing recess provided in the web; and d. seal means disposed within the housing assembly for confining the lubricant within the bearing, the web opening and the lubricant containing recess.

2. The improvement as defined in claim 1 wherein the seal means comprises a cover plate secured to the web and overlying the web opening, said cover plate being provided with an annular opening, and a double-lip seal ring fitted in the annular opening.

3. The improvement as defined in claim 2, wherein the bearing is a pair of roller bearings fitted side-by-side and coaxially in the web opening, and the seal means includes a further cover plate cooperating with the cover plate for bracketing the bearings, the further cover plate being constructed like the cover plate, the web being provided with a further recess for receiving lubricant from one of the roller bearings, while the recess receives lubricant from the other of the roller bearings.

4. The improvement as defined in claim 3, wherein the housing assembly has an inlet port arranged for receiving air, and with an outlet port including means for diffusing the air received from a case formed by the housing assembly, the case acting as an expansion chamber for the air received at the inlet port for permitting the air to absorb heat from the seal means and remove the heat from the housing assembly while maintaining a low operating noise level.

* * * * *